(12) United States Patent
Sahashi

(10) Patent No.: US 11,932,056 B2
(45) Date of Patent: Mar. 19, 2024

(54) COMPETITION WHEELCHAIR TIRE

(71) Applicant: BRIDGESTONE CORPORATION, Tokyo (JP)

(72) Inventor: Kohei Sahashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 288 days.

(21) Appl. No.: 17/594,383

(22) PCT Filed: Dec. 10, 2019

(86) PCT No.: PCT/JP2019/048339
§ 371 (c)(1),
(2) Date: Oct. 14, 2021

(87) PCT Pub. No.: WO2020/213207
PCT Pub. Date: Oct. 22, 2020

(65) Prior Publication Data
US 2022/0176749 A1 Jun. 9, 2022

(30) Foreign Application Priority Data
Apr. 17, 2019 (JP) ................. 2019-078874

(51) Int. Cl.
*B60C 11/12* (2006.01)
*B60C 11/01* (2006.01)

(52) U.S. Cl.
CPC .............. *B60C 11/12* (2013.01); *B60C 11/01* (2013.01); *B60C 2200/00* (2013.01)

(58) Field of Classification Search
CPC ...... B60C 11/12; B60C 11/01; B60C 2200/00
See application file for complete search history.

(56) References Cited

U.S. PATENT DOCUMENTS

| 7,156,407 B2 | 1/2007 | Jahn |
| 2002/0125678 A1 | 9/2002 | Jahn |
| 2018/0126789 A1* | 5/2018 | Matsunami ........... B60C 11/033 |

FOREIGN PATENT DOCUMENTS

| CN | 109334353 A | 2/2019 |
| CN | 208630276 U * | 3/2019 |

(Continued)

OTHER PUBLICATIONS

Huang, English Machine Translation of CN 109334353, 2019 (Year: 2019).*

(Continued)

*Primary Examiner* — Justin R Fischer
*Assistant Examiner* — Brendon Charles Darby
(74) *Attorney, Agent, or Firm* — KENJA IP LAW PC

(57) ABSTRACT

In regions, divided by the tire equator, on both sides of the tread surface of a tire, the tire includes a grip area along the entire circumference of the tread, the grip area including a plurality of recessed lines, with a shape recessed toward an inner side of the tire from the outline of the tread surface, that extend from the tread edge side in a direction inclined relative to the tire equator and are arrayed in parallel, and a plurality of sipes that extend toward the tire equator in a direction inclined relative to the tire equator, starting in the grip area and terminating before the tire equator. The negative ratio in the grip area is higher than the negative ratio closer to the tire equator than the grip area.

9 Claims, 8 Drawing Sheets

(56) References Cited

FOREIGN PATENT DOCUMENTS

| CN | 209305249 U | 8/2019 |
|---|---|---|
| JP | 2003341307 A | 12/2003 |

OTHER PUBLICATIONS

Uchida, English Machine Translation of JP 2003341307, 2003 (Year: 2003).*
Chen, English Machine Translation of CN 208630276 U, 2019 (Year: 2019).*
Mar. 17, 2020, International Search Report issued in the International Patent Application No. PCT/JP2019/048339.
Sep. 28, 2021, International Preliminary Report on Patentability issued in the International Patent Application No. PCT/JP2019/048339.
Dec. 20, 2022, search result of Office Action issued by the China National Intellectual Property Administration in the corresponding Chinese Patent Application No. 201980095446.8.
Nov. 21, 2022, search result of the Extended European Search Report issued by the European Patent Office in the corresponding European Patent Application No. 19925173.7.

* cited by examiner

COMPETITION WHEELCHAIR TIRE

TECHNICAL FIELD

The present disclosure relates to a tire for wheelchairs used in various competitions, and in particular proposes a competition wheelchair tire provided with grip for the hand of a user seated in the wheelchair and with drainage performance.

BACKGROUND

In self-propelled wheelchairs in which the wheelchair users control the movement of the tires by themselves, a hand rim coaxial with the tire is provided on the axial outer side of the tire on both sides of the chair portion, and users rotate the hand rims by hand to propel the wheelchairs by themselves.

In particular, when playing in a sports competition, such as tennis, while seated in a competition wheelchair, athletes must quickly react and change their behavior as the game unfolds, both quickly changing their own position and making minute adjustments to their position. The athletes therefore need to touch the tires directly with their hands and control the movement of the wheelchair at the appropriate timing for pushing and braking of the wheelchair.

CITATION LIST

Patent Literature

PTL 1: U.S. Pat. No. 7,156,407B2

SUMMARY

Technical Problem

Here, if the tire has a raised portion, an athlete's hand may be injured by the edge of the raised portion or the like when the hand directly touches the tire. To prevent the athlete's hand from being injured, the wheelchair tire described in Patent Literature (PTL) 1, for example, is provided with a smooth, even surface in the area where the hand touches.

With a competition wheelchair, however, it is necessary to rotate the tires so that the wheelchair moves from a stopped state to a fast speed when pushing, and to stop the rotation of the tires abruptly when braking. Better grip is thus required between the athlete's hands and the tires. At such times, the wheelchair tire of PTL 1, with no uneven surface properties whatsoever, has insufficient grip for the user's hand.

On the other hand, it is known that providing the contact region between the tread surface and the contact patch with surface properties having no unevenness is effective for improving the grip in the contact patch.

It is therefore an aim of the present disclosure to provide a competition wheelchair tire that achieves both grip for the hand of an athlete and grip in the contact patch, without injuring the hand.

Solution to Problem

We carefully studied how to solve the aforementioned problem. Upon studying the contact region with the contact patch of a competition wheelchair tire and the contact region with the hand in detail, we discovered that modifying the surface properties of the contact region with the contact patch together with those of the contact region with the hand can achieve both grip for the hand and grip in the contact patch, thereby completing the present disclosure.

We provide the following.

A competition wheelchair tire according to the present disclosure includes:

in regions, divided by a tire equator, on both sides of a tread surface of a tire, a grip area along an entire circumference of a tread, the grip area including a plurality of recessed lines, with a shape recessed toward an inner side of the tire from an outline of the tread surface, that extend from a tread edge side in a direction inclined relative to the tire equator and are arrayed in parallel; and a plurality of sipes that extend toward the tire equator in a direction inclined relative to the tire equator, starting in the grip area and terminating before the tire equator, wherein a negative ratio in the grip area is higher than a negative ratio closer to the tire equator than the grip area.

Here, "terminating before the tire equator" means that the sipes starting from the grip area extend without reaching the tire equator and terminate in the same region divided by the tire equator, at a position separated from the tire equator.

The "tread edge" is the outer edge in the width direction of the formation region of the tread pattern, which is formed according to the requirements of each wheelchair tire. The "negative ratio in the grip area" refers to the ratio, in a developed view of the tread surface, of the area of recesses, such as recessed lines and sipes, to the total area of the grip area in a case in which recesses are not formed. The "negative ratio closer to the tire equator than the grip area" refers to the ratio, in a developed view of the tread surface, of the area of recesses to the total area of a region closer to the tire equator than the grip area in a case in which recesses are not formed.

Furthermore, unless otherwise stated, the positions and dimensions refer to those in the state of the product tire.

Advantageous Effect

According to the present disclosure, a competition wheelchair tire that achieves both grip for the hand and grip in the contact patch can be provided.

DETAILED DESCRIPTION

First Embodiment

Exemplary embodiments of a competition wheelchair tire according to the present disclosure (also referred to below simply as a "tire") are described below in detail with reference to the drawings.

Figure 1A:
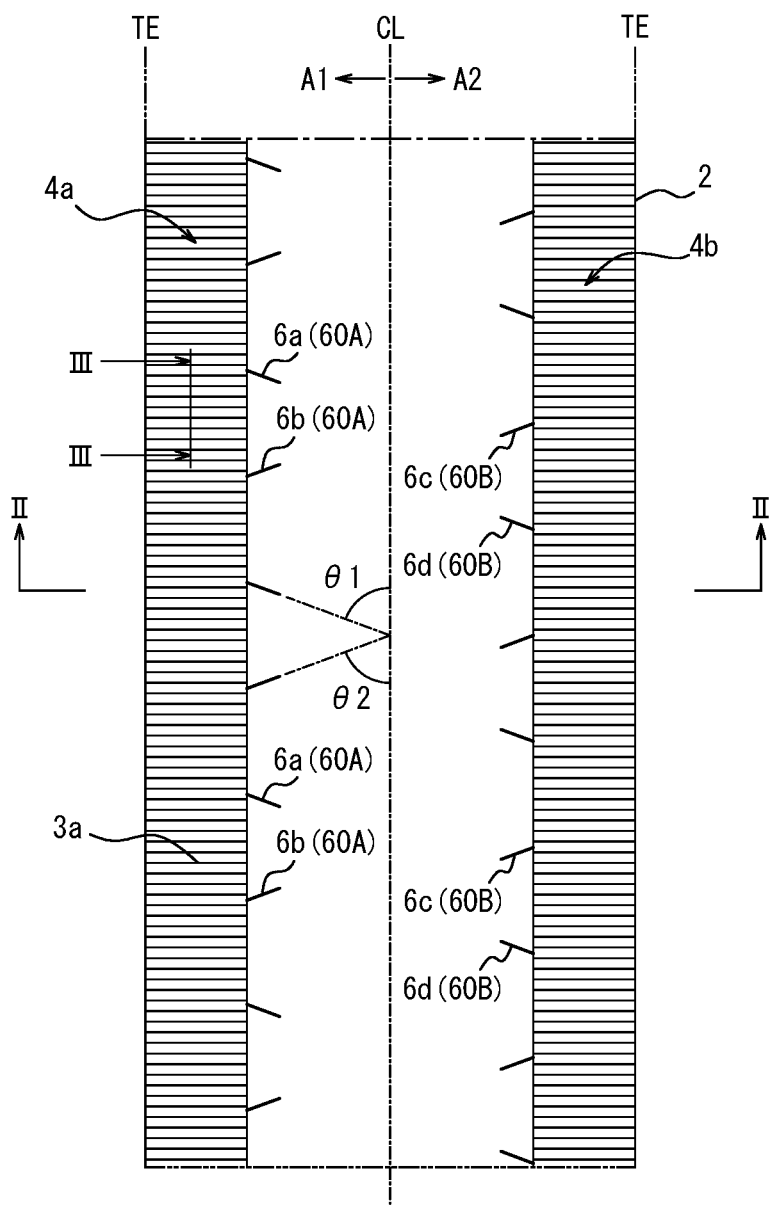
FIG. 1A is a diagram illustrating a portion of a tire according to a first embodiment of the present disclosure, developed in the tread width direction.
Figure 1B:
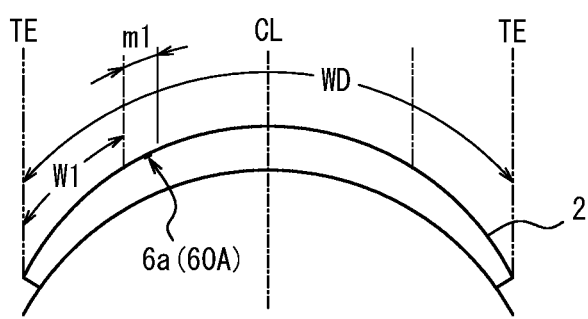
FIG. 1B is a schematic cross-sectional view along line II-II of FIG. 1A.
Figure 2A:
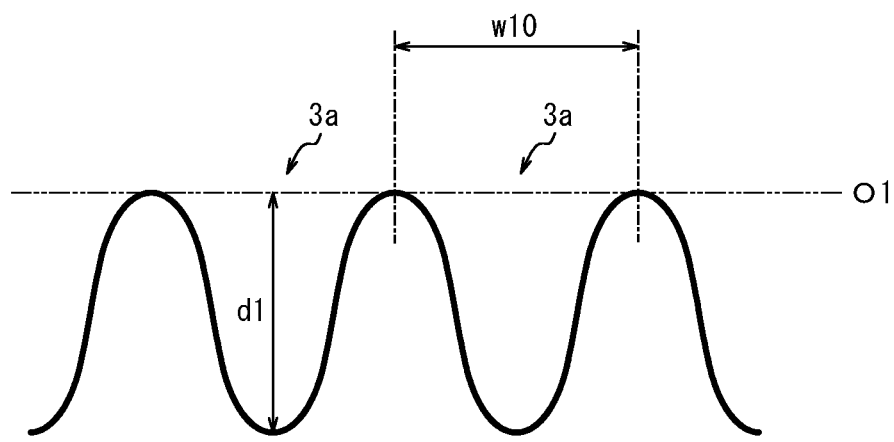
FIG. 2A is a cross-sectional view along line of FIG. 1A.

FIG. 1A is a diagram illustrating a portion of a tread surface 2 of a tire 1 according to a first embodiment of the present disclosure, developed in the tread width direction, and FIG. 1B is a schematic cross-sectional view along line II-II of FIG. 1A. FIG. 2A is a cross-sectional view along line of FIG. 1A. Although the internal structure of the tire 1 is not limited and is omitted from the drawings, from the viewpoint of durability, the tire 1 preferably includes a carcass, as a framework, extending between a pair of bead portions and a tread on the outer side of the carcass in the tire radial direction.

The tire 1 includes grip areas 4a, 4b in regions A1, A2, divided by the tire equator CL, on both sides of the tread surface 2. In the grip areas 4a, 4b, a plurality of recessed lines 3a, 3b, with a shape recessed toward the inner side of the tire from an outline of the tread surface 2, extend from the tread edge TE side in a direction inclined relative to the tire equator CL and are arrayed in parallel. The shapes of the recessed lines 3a, 3b are described in detail below, using the recessed line 3a as a typical example.

As illustrated in FIG. 2A, the recessed line 3a has a shape that is recessed toward the inner side of the tire more than an outline O1 of the tread surface 2, that is, the line along the tread surface 2 when the recessed portion is omitted in a cross-sectional view in the tread width direction. The recessed shape is not particularly limited, but in the illustrated example, the recessed shape is a curved shape recessed from the outline O1, and a plurality of recessed lines 3a are arranged in parallel to yield a waveform.

Figure 2B:
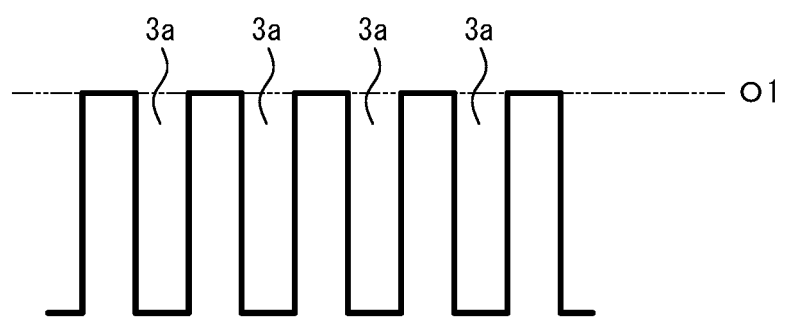
FIG. 2B is a cross-sectional view along line of FIG. 1A.

The cross-sectional shape of the recessed lines 3a is not limited to the example illustrated in FIG. 2A, but rather can be appropriately modified. For example, a form with rectangular openings from the outline O1, as illustrated in FIG. 2B, can be adopted.

When an athlete directly touches the grip area 4a of the tire 1 with the hand during pushing, braking, etc. of the competition wheelchair, the plurality of recessed lines 3a arrayed in the grip area 4a come into contact with the hand. When the plurality of recessed lines 3a come into contact with the surface of the hand, friction is generated between the recessed lines 3a and the hand to provide grip. At this time, since the recessed lines 3a have a shape that is recessed from the outline O1 of the tread surface 2, the surface of the hand and fingers is not pushed or strongly contacted by a component protruding from the outline O1 of the tread surface 2. The grip can thus be enhanced without injuring the hands of the athlete.

The depth dl of the recessed lines 3a is not particularly limited but is preferably between 0.5 mm and 2.0 mm. By the depth dl being set to 0.5 mm or more, the grip for the hand can be sufficiently enhanced, and by the depth dl being set to 2.0 mm or less, the rigidity of the tread surface 2 can be maintained.

Furthermore, an opening width w10 of the recessed lines 3a is not particularly limited but is preferably between 0.5 mm and 2.0 mm. Here, the opening width w10 of the recessed lines 3a refers to the opening length orthogonal to the extending direction of the recessed lines 3a on the outline O1. By the opening width w10 being set to 0.5 mm or more, the grip for the hand can be further improved, and by the opening width w10 being set to 2.0 mm or less, the rigidity of the tread surface 2 can be maintained, while also preventing foreign matter such as sand from entering the recessed lines 3a and damaging the inside of the recessed lines 3a or injuring the hands of the athlete.

Here, it is essential for the grip area 4a to have an array of recessed lines 3a extending in a direction inclined relative to the tire equator CL. That is, the competition wheelchair tire is mainly used for forward and backward movements in the front-back direction, particularly in ball games such as tennis, and the direction of input of force by the hand is also in the front-back direction. Therefore, the formation of recessed lines in a direction that crosses the front-back direction, i.e., a direction that is inclined relative to the tire circumferential direction, enhances the gripping force between the tire 1 and the hand.

The grip area 4a particularly preferably has an array of recessed lines 3a extending in a direction orthogonal to the tire equator CL. By the recessed lines 3a being oriented orthogonally to the tire equator CL, which is an orientation that resists the input of force along the front-back direction, the grip for the hand in particular can be improved, facilitating control when starting to push and when stopping suddenly.

In the illustrated example, the grip area 4a has an array of recessed lines, inclined in a single direction relative to the tire equator CL, over the entire circumference of the tire, but a plurality of recessed lines inclined in different directions may be arranged simultaneously, such as in a grid, over a portion or the entire circumference of the tire.

Furthermore, the recessed lines 3a start from the tread edge TE side, i.e., from the region adjacent to the tread edge TE. When the athlete directly touches the tire 1 with the hand, the hand mainly touches the region adjacent to the tread edge TE. That is, when the athlete is pushing or braking the competition wheelchair, the athlete touches the region adjacent to the tread edge TE on the side closer to the athlete's body to rotate the tire 1.

The recessed lines 3a preferably have a starting point at a position between 7.0% and 33.0% of a length WD along the periphery of the tread surface 2 in the width direction from the tread edge TE, and the starting point is more preferably located at the tread edge TE. This is because the region where the input of force by the athlete's hand is particularly strong tends to be located here.

A length W1 in the tread width direction, along the periphery of the tread surface 2, of the grip area 4a in which the recessed lines 3a are arrayed is preferably between 7.0% and 33.0% of the length WD of the tread surface 2 in the width direction. By the ratio W1/WD being set to 7.0% or more, the grip for the athlete's hand can be sufficiently enhanced, and by the ratio W1/WD being set to 33.0% or less, the rigidity of the tread surface 2 can be maintained.

Furthermore, it is essential for the tire 1 to include the grip area 4a, in which the recessed lines 3a are arrayed, along the entire circumference of the tire, so that a good grip can be obtained regardless of which part, in the tire circumferential direction, of the rolling tire is contacted by the athlete's hand.

By the grip areas 4a, 4b being arranged in respective regions A1, A2 on both sides, divided by the tire equator CL, the grip of the tire 1 for the hand can be enhanced regardless of the mounting direction of the tire. That is, as described above, when the athlete is pushing or braking the competition wheelchair, the athlete touches the region adjacent to the tread edge TE on the side closer to the athlete's body to rotate the tire 1. The side closer to the athlete's body is determined by the mounting direction of the tire, but grip for the hand can be provided regardless of the direction in which the tire is mounted. In general, a competition wheelchair tire is mounted with a negative camber to facilitate the turning motion of the entire wheelchair. With this type of mounting, one of the regions A1, A2 is mainly in contact with the contact patch, and wear tends to occur in the region that is in contact with the contact patch. After wear has progressed in one of the regions A1, A2, the tire 1 is often remounted in the opposite mounting direction. Therefore, by the grip areas 4a or 4b being provided in both regions A1, A2, grip can be provided both before and after remounting.

In the grip areas 4a, 4b, the recessed lines 3a, 3b preferably extend in a direction that is linearly symmetrical with respect to the tire equator CL, with the tire equator CL as the axis of symmetry, in order to provide the same grip for the hand in both mounting directions. The recessed lines 3a, 3b may, however, extend at different inclination angles with respect to the tire equator CL.

Next, the tire 1 includes a plurality of sipes 6a, 6b, and 6c, 6d, in the regions A1, A2, that extend from the grip areas 4a, 4b toward the tire equator CL.

Figure 3:
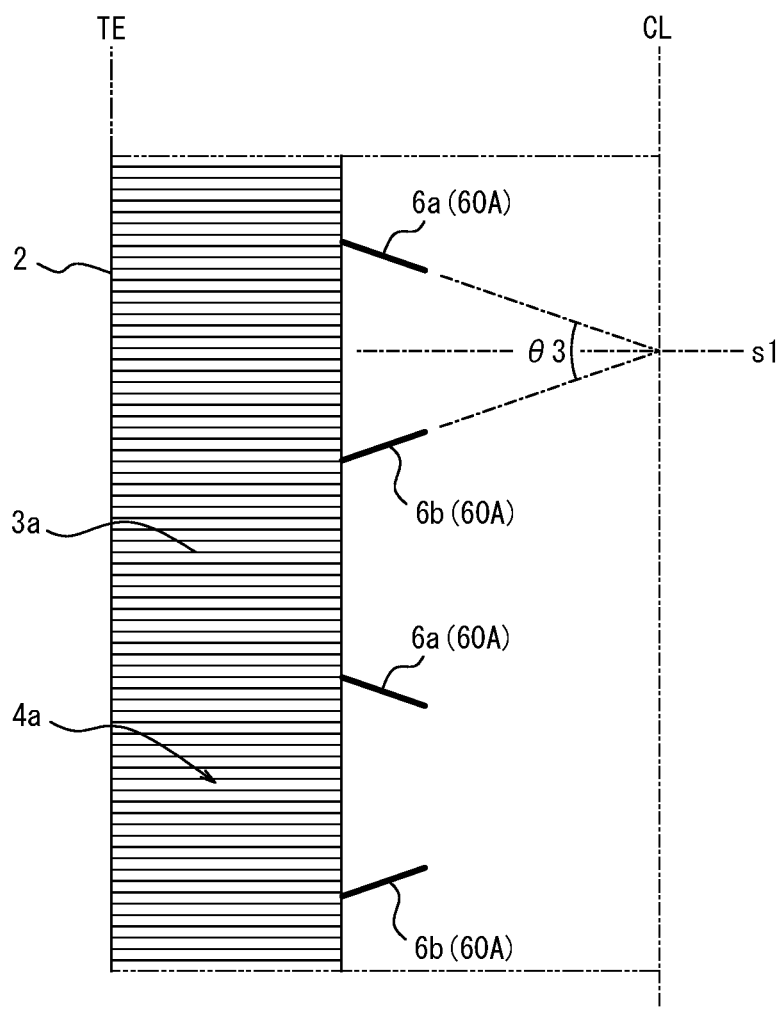
FIG. 3 is a partially enlarged view of FIG. 1.

The region A1 is described below as a representative example, with reference to FIGS. 1 and 3. In the region A1, the sipes 6a, 6b start at the grip area 4a, extend toward the tire equator CL in a direction inclined relative to the tire equator CL, and terminate before the tire equator CL. Starting in the grip area 4a is not limited to the case of extending from the edge of the grip area 4a on the tire equator CL side as illustrated in the figures. The sipes 6a, 6b may also include a portion extending in the grip area 4a.

As described above, forward and backward movements in the front-back direction are mainly performed, particularly in ball games such as tennis, and the direction of input of force by the hand is also in the front-back direction. Therefore, by the sipes 6a, 6b extending in a direction that crosses the front-back direction, that is, in a direction inclined relative to the tire equator CL, grip can be provided between the tread surface 2 and the hand by the edge component of the sipes when the hand touches the sipes 6a or 6b. Since the sipes 6a, 6b also have a shape that is recessed from the outline O1 of the tread surface 2, like the recessed lines 3a, the surface of the hand and fingers is not pushed or strongly contacted by a component protruding from the outline O1 of the tread surface 2. The grip can thus be enhanced without injuring the hands of the athlete.

Also, according to the above configuration, when an athlete sweats during a game or the like, the hand can be prevented from slipping against the tread surface 2. That is, when an athlete sweats during a game or the like, and a film of sweat is present between the fingers or palm and the tread surface, the grip between the hand and the tread surface is hindered, and the hand slips against the tread surface. When the wet hand of the athlete comes into contact with the sipes 6a, 6b, however, the moisture of the sweat is taken into the sipes 6a, 6b and discharged, as the tire rotates, along the direction in which the sipes 6a, 6b extend at an inclination relative to the tire equator CL.

Here, it is essential for the negative ratio in the grip area 4a to be higher than the negative ratio closer to the tire equator CL than the grip area 4a. That is, during movement of the tire in the front-back direction, the ground contact pressure tends to increase on the tire equator CL side more than on the tread edge TE side of the tread surface 2. By the negative ratio being lower closer to the tire equator CL than the grip area 4a and increasing the footprint area with the contact patch, a good grip in the contact patch can be achieved.

The value of the negative ratio closer to the tire equator CL than the grip area 4a is not particularly limited but is preferably between 2% and 10%. By the negative ratio closer to the tire equator CL than the grip area 4a being between 2% and 10%, the footprint area with the contact patch can be sufficiently secured, and a better grip in the contact patch can be achieved. The negative ratio in the grip area 4a is preferably larger than the negative ratio closer to the tire equator CL in order to achieve sufficient grip for the hand with the recessed lines 3a.

Since the sipes 6a, 6b terminate before the tire equator CL, the tire equator CL and the region adjacent to the tire equator CL can be provided with surface properties without unevenness, so that good grip in the contact patch can be achieved.

The sipes 6a, 6b are preferably arranged in the region of the tread surface 2 with which both the hand and the contact patch come into contact. That is, as the tire 1 rotates, the process of the tread surface 2 of the tire 1 coming into contact with the hand of the athlete and then moving towards and coming into contact with the contact patch is repeated. Therefore, the tread surface 2 has both a contact region with the athlete's hand and a contact region with the contact patch. The contact region with the hand and the contact region with the contact patch vary depending on the camber angle at the time of mounting, the load, and the like. However, the region adjacent to the tread edge TE on the side closer to the athlete's body usually comes into contact with the hand, and in a tennis competition, in which movements are mainly straight forward or backward, the tire equator CL and the region adjacent to the tire equator CL usually come into contact with the contact patch. In addition, the contact region with the hand and the contact region with the contact patch may overlap between the portion of the contact region with the hand on the side of the tire equator CL and the portion of the contact region with the contact patch on the side of the tread edge TE. By the sipes being arranged in this overlapping area, the grip for the hand and the grip in the contact patch can be efficiently improved.

The sipes 6a, 6b preferably terminate at a position that is 17% to 35% of the length WD along the periphery of the tread surface 2 in the width direction from the tire equator CL. That is, by the distance from the tire equator CL to the sipes 6a, 6b being set to 17% or more of the length WD of the tread surface 2 in the width direction, the tire equator CL and the region adjacent to the tire equator CL can be provided with surface properties without unevenness, further improving the grip in the contact patch. By the distance being set to 35% or less, the grip for the hand can be sufficiently secured.

The sipes 6a, 6b preferably have a length ml in the tread width direction of 12% to 65% of the length WD along the periphery of the tread surface 2 in the width direction from the edge of the grip area 4a on the tire equator CL side. By the length ml of the sipes 6a, 6b in the tread width direction being set to 12% or more of the length WD of the tread surface 2 in the width direction, the grip for the hand can be sufficiently improved, and by the length ml in the tread width direction being set to 65% or less, the footprint area with the contact patch on the tire equator CL side can be sufficiently improved.

Although the inclination angles of the sipes 6a, 6b relative to the tire equator CL are not particularly limited, the angle θ1 of the sipes 6a relative to the tire equator CL and the angle θ2 of the sipes 6b relative to the tire equator CL are preferably each between 30° and 90°. By the angles θ1 and θ2 each being between 30° and 90°, a better grip can be achieved for a hand performing movements in the front-back direction.

Furthermore, the plurality of sipes 6a, 6b preferably includes a plurality of pairs of linearly symmetrical sipes 60A such that each pair of adjacent sipes 6a, 6b is in a linearly symmetrical relationship with a line segment orthogonal to the tire equator CL, i.e. a line segment along the tread width direction, as an axis of symmetry s1. In the illustrated example, the pairs of linearly symmetrical sipes 60A are formed over the entire circumference of the tire. In the pairs of linearly symmetrical sipes 60A, each sipe 6a, 6b is preferably inclined to separate from the axis of symmetry s1 from the tire equator CL towards the tread edge TE. According to the above configuration, since the sipes 6a, 6b are inclined in different directions relative to the tire equator CL, a good grip between the hand and the tread surface 2 can be achieved in the case of input of force by the hand from various directions, i.e. not only for linear motion of the competition wheelchair but also for turning motion and the like. According to the above configuration, sweat can also be drained more efficiently from the tire equator CL side towards the tread edge TE side.

An angle θ3, which opens to the tread edge TE side, between the sipes 6a, 6b is preferably between 10° and 135°. According to the above configuration, sweat can also be drained more efficiently from the tire equator CL side to the tread edge TE side.

An opening width w3 orthogonal to the extending direction of the sipes 6a, 6b is preferably between 2.0 mm and 20.0 mm. By the opening width w3 of the sipes 6a, 6b being set to 2.0 mm or more, the edge effect against input of force by the hand can be increased, and a sufficient drainage function can be provided. By the opening width w3 being set to 20.0 mm or less, the grip in the contact patch can be increased.

A maximum depth d4 of the sipes 6a, 6b is preferably between 0.5 mm and 2.0 mm. By the maximum depth d4 of the sipes 6a, 6b being set to 0.5 mm or more, the sipes 6a, 6b can be provided with a sufficient drainage function, and by the maximum depth d4 being set to 2.0 mm or less, the rigidity of the tread surface 2 can be maintained.

From the perspective of uniformity and of even wear in the tread width direction, the pairs of linearly symmetrical sipes 60A formed in the grip area 40a and pairs of linearly symmetrical sipes 60B formed in the grip area 40b are preferably arranged to have a phase difference along the tire equator CL between the regions A1, A2. For example, in the present specification, stating that a constituent element X and a constituent element Y "are arranged to have a phase difference along the tire equator CL" may mean that the constituent element X and the constituent element Y "have different positions from each other relative to the tire equator CL".

The shapes of the recessed lines and the sipes are not limited to the examples illustrated in FIG. 1, but can be appropriately modified, such as to the forms illustrated in FIGS. 4A, 4B, 4C, 4D, and 4E. The region A1 is described below as a representative example.

Figure 4A:
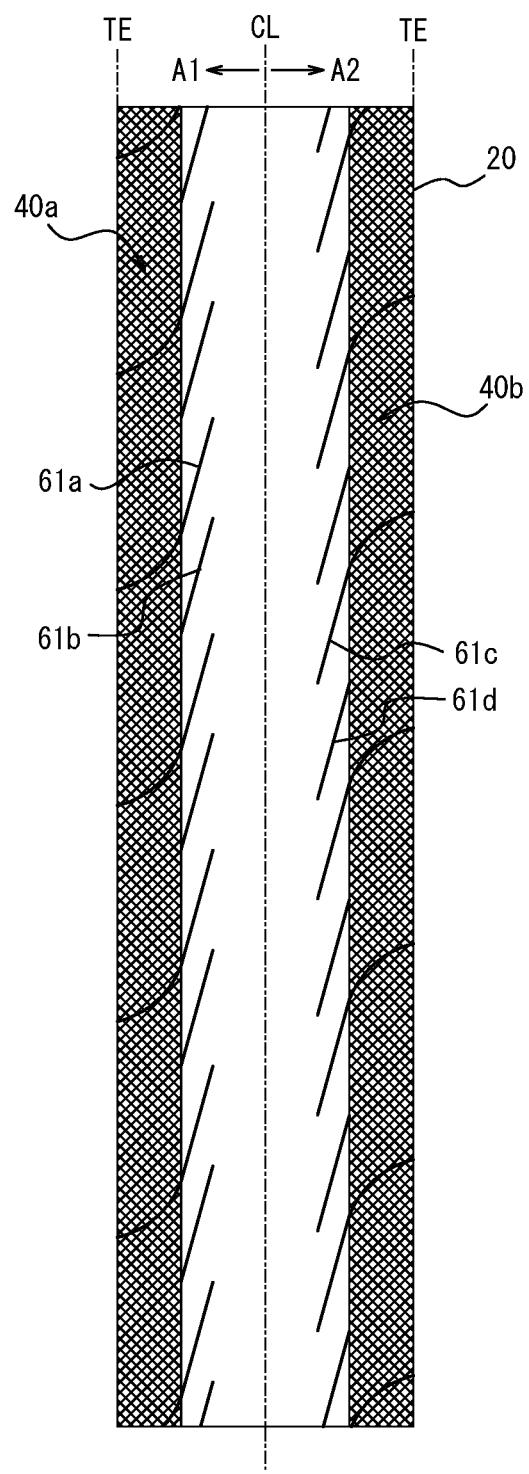
FIG. 4A is a diagram illustrating a variation of recessed lines and sipes of a tire according to the present disclosure.

In FIG. 4A, the grip areas 40a, 40b have recessed lines extending in a plurality of directions and intersecting to form a grid-like pattern on the tread surface 2. The sipe 61a extends from the tread edge TE, crosses the grip area 40a with a curved shape, and extends in a straight line to a point before the tire equator CL. The sipe 61b extends from the edge of the grip area 40a on the tire equator CL side and extends in a straight line to a point before the tire equator CL. The sipes 61a, 61b and the sipes 61c, 61d are arranged to have a phase difference along the tire equator CL between the regions A1, A2.

Figure 4B:
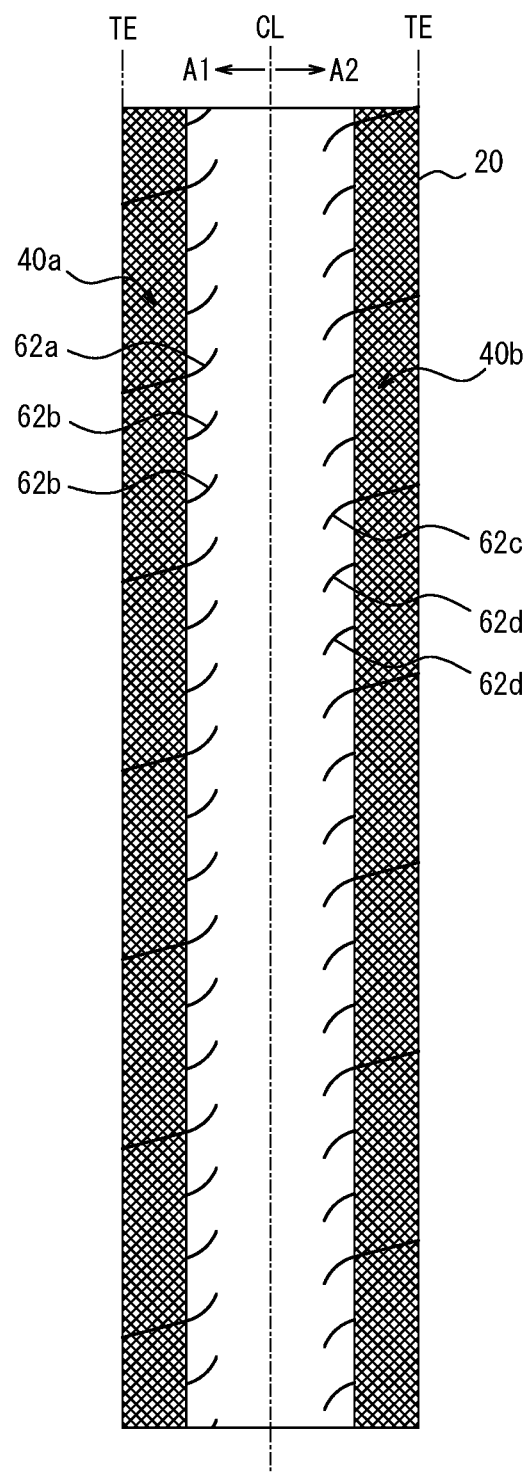
FIG. 4B is a diagram illustrating a variation of recessed lines and sipes of a tire according to the present disclosure.

In FIG. 4B, as in FIG. 4A, the grip areas 40a, 40b form a grid-like pattern on the tread surface 2. The sipe 62a extends from the tread edge TE, crosses the grip area 40a in a straight line, and extends with a curved shape to a point before the tire equator CL. The sipe 62b extends from the edge of the grip area 40a on the tire equator CL side with a curved shape to a point before the tire equator CL. The sipes 62a, 62b and the sipes 62c, 62d are arranged to have a phase difference along the tire equator CL between the regions A1, A2.

Figure 4C:
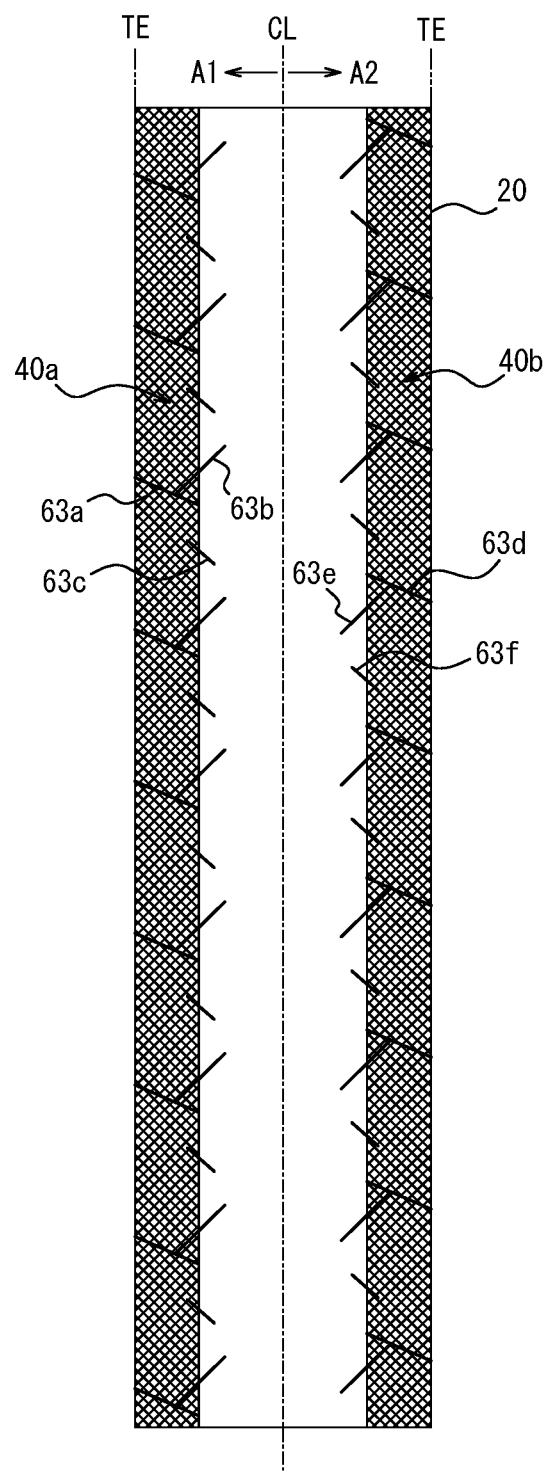
FIG. 4C is a diagram illustrating a variation of recessed lines and sipes of a tire according to the present disclosure.

In FIG. 4C, as in FIG. 4A, the grip areas 40a, 40b form a grid-like pattern on the tread surface 2. The sipe 63a extends from the tread edge TE in a straight line to the edge of the grip area 40a on the tire equator CL side. The sipe 63b extends from the sipe 63a towards the tire equator CL in a straight line, in a different direction than the direction in which the sipe 63a extends, and terminates before the tire equator CL. The sipe 63c extends in a straight line starting within the grip area 40a, from near the edge of the grip area 40a on the tire equator CL side, and terminates before the tire equator CL. The sipes 63a, 63b, 63c and the sipes 63d, 63e, 63f are arranged to have a phase difference along the tire equator CL between the regions A1, A2.

Figure 4D:
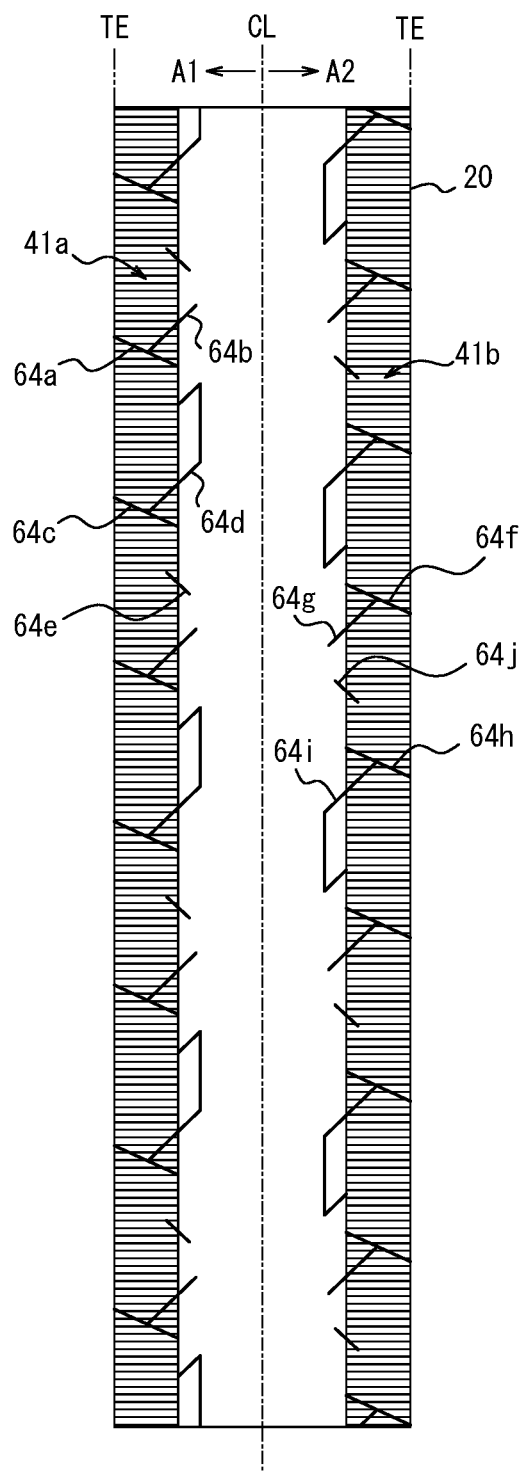
FIG. 4D is a diagram illustrating a variation of recessed lines and sipes of a tire according to the present disclosure.

In FIG. 4D, the grip areas 41a, 41b have an array of recessed lines extending in a direction orthogonal to the tire equator CL. The sipes 64a, 64c extend from the tread edge TE in a straight line to the edge of the grip area 41a on the tire equator CL side. The sipe 64b extends from the sipe 64a towards the tire equator CL in a straight line, in a different direction than the direction in which the sipe 64a extends, and terminates before the tire equator CL. The sipe 64d extends from the sipe 64c towards the tire equator CL in a straight line, in a different direction than the direction in which the sipe 64c extends, bends before the tire equator CL, extends in a direction along the tire equator CL, and bends again before extending to the grip area 41a. The sipe 64e extends in a straight line starting within the grip area 41a, from near the edge of the grip area 41a on the tire equator CL side, and terminates before the tire equator CL. The sipes 64a, 64b, 64c, 64d, 64e and the sipes 64f, 64g, 64h, 64i, 64j are respectively arranged to have a phase difference along the tire equator CL between the regions A1, A2.

Figure 4E:
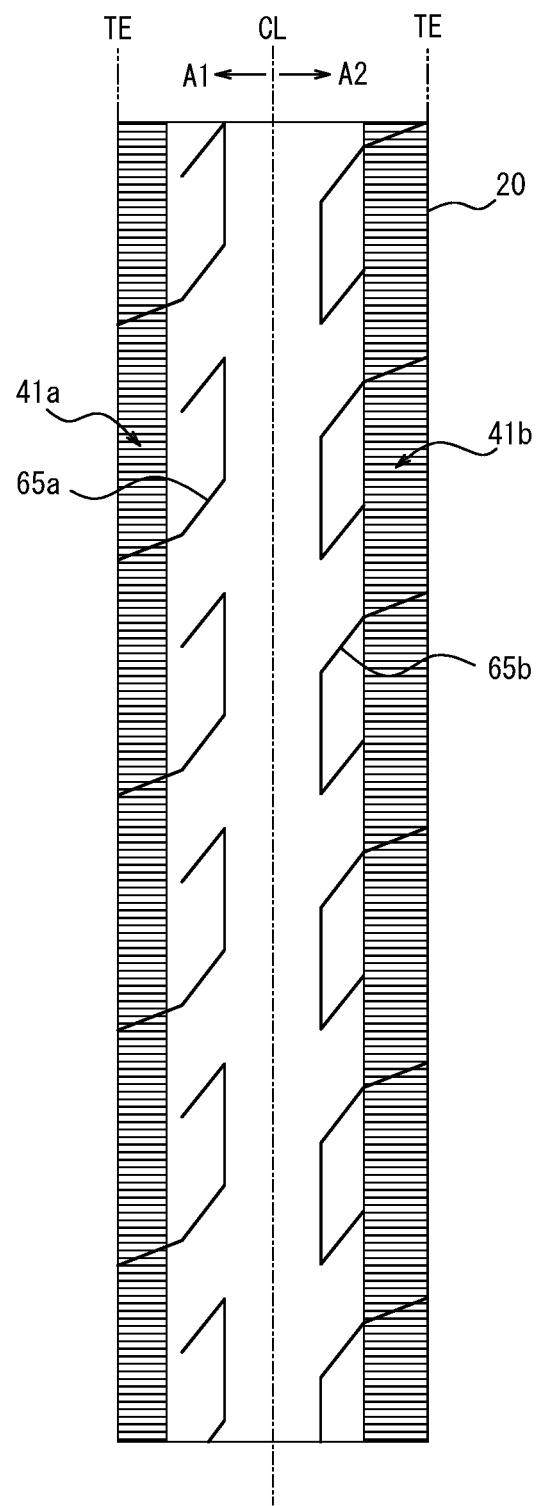
FIG. 4E is a diagram illustrating a variation of recessed lines and sipes of a tire according to the present disclosure.

In FIG. 4E, the grip areas 41a, 41b have an array of recessed lines extending in a direction orthogonal to the tire equator CL. The length along the periphery of the grip area 41a in the tread width direction is narrower than that of the grip area 41b. The sipe 65a extends from the tread edge TE across the grip area 41a, extends after bending at a point closer to the tire equator CL than the grip area 41a, bends again on the tire equator CL side, extends in a direction along the tire equator CL, and then bends before extending towards the grip area 41a. The sipe 65b extends from the tread edge TE across the grip area 41b, extends after bending at the edge of the grip area 41b on the tire equator CL side, bends again on the tire equator CL side, extends in a direction along the tire equator CL, and then bends before extending to the grip area 41b.

Examples of the present disclosure are described below, but the present disclosure is not limited to the Examples.

An Example Tire and a Comparative Tire (each having a tire size of 23-590 (ETRTO: The European Tyre and Rim Technical Organisation)) according to the specifications listed in Table 1 were prepared, and the grip for the athlete's hand and the grip in the contact patch were evaluated.

[Grip (Hand)]

The tires were mounted on a competition wheelchair. The degree of grip for the hand was evaluated subjectively by the athlete in comparison with the Comparative Tire.

[Grip (Contact Patch)]

The tires were mounted on a competition wheelchair. The degree of grip was evaluated subjectively by the athlete in comparison with the Comparative Tire.

TABLE 1

|  | Comparative Example 1 | Example 1 |
|---|---|---|
| Drawing indicating pattern | — | FIG. 1A |
| Form of grip area (projections relative to outline O1: projecting lines; recesses relative to outline O1: recessed lines) | projecting lines | recessed lines |
| Shape of projecting lines or recessed lines | quadrangular pyramid | FIG. 2A |
| Orientation of projecting lines or recessed lines | — | inclined relative to equator |
| Direction of projecting lines or recessed lines (unidirectional or grid) | grid | unidirectional |
| Depth dl (mm) of projecting lines or recessed lines | 0.5 | 0.5 to 2.0 |
| Sipes | — | yes |
| Angle θ1(°) relative to tire equator | — | 30 to 90 |
| Angle θ2(°) relative to tire equator | — | 30 to 90 |
| Distance between tire equator CL and sipes/length WD along periphery of tread surface in width direction | — | 10.8 |
| Length ml of sipes | — | 1.0 to 5.2 |
| Depth dl (mm) of sipes | — | 0.5 to 2.0 |
| Opening width w10 (mm) of sipes | — | 0.5 to 2.0 |
| Grip (hand) | Equivalent between Comparative Example 1 and Example 1 | |
| Grip (contact patch) | Better for Example 1 than for Comparative Example 1 | |

REFERENCE SIGNS LIST

1 Tire
2, 20 Tread surface
3a, 3b Recessed line
4a, 4b, 40a, 40b, 41a, 41b Grip area
6a, 6b, 6c, 6d Sipe
60A, 60B Pair of linearly symmetrical sipes
61a, 61b, 61c, 61d Sipe
62a, 62b, 62c, 62d Sipe
63a, 63b, 63c, 63d, 63e, 63f Sipe
64a, 64b, 64c, 64d, 64e, 64f, 64g, 64h, 64i, 64j Sipe
65a, 65b Sipe
CL Tire equator
TE Tread edge
A1, A2 Region
O1 Outline
s1 Axis of symmetry

The invention claimed is:

1. A competition wheelchair tire comprising: in regions, divided by a tire equator, on both sides of a tread surface of a tire, a grip area along an entire circumference of a tread, the grip area including a plurality of recessed lines, with a shape recessed toward an inner side of the tire from an outline of the tread surface, that extend from a tread edge side in a direction inclined relative to the tire equator and are arrayed in parallel; and a plurality of sipes that extend from the grip area toward the tire equator in a direction inclined relative to the tire equator, and terminate between a tire equator side edge of the grip area and the tire equator, wherein the plurality of sipes do not extend into the grip area, a negative ratio in the grip area is higher than a negative ratio closer to the tire equator than the grip area, an area inside the tire equator side edge of the grip area in a tread width direction is free of recessed lines, and an opening width of the plurality of sipes is larger than an opening width of the plurality of the recessed lines.

2. The competition wheelchair tire of claim 1, wherein the grip area includes an array of recessed lines extending orthogonally relative to the tire equator.

3. The competition wheelchair tire of claim 2, wherein the plurality of sipes includes a plurality of pairs of linearly symmetrical sipes such that each pair of adjacent sipes is in a linearly symmetrical relationship with a line segment orthogonal to the tire equator as an axis of symmetry, and
each sipe in the pairs of linearly symmetrical sipes is inclined to separate from the axis of symmetry from the tire equator towards the tread edge.

4. The competition wheelchair tire of claim 3, wherein the pairs of linearly symmetrical sipes are arranged to have a phase difference along the tire equator between the regions.

5. The competition wheelchair tire of claim 1, wherein the plurality of sipes includes a plurality of pairs of linearly symmetrical sipes such that each pair of adjacent sipes is in a linearly symmetrical relationship with a line segment orthogonal to the tire equator as an axis of symmetry, and
each sipe in the pairs of linearly symmetrical sipes is inclined to separate from the axis of symmetry from the tire equator towards the tread edge.

6. The competition wheelchair tire of claim 5, wherein the pairs of linearly symmetrical sipes are arranged to have a phase difference along the tire equator between the regions.

7. The competition wheelchair tire of claim 1, wherein the negative ratio closer to the tire equator than the grip area is between 2% and 10%.

8. The competition wheelchair tire of claim 1, wherein the opening width of the plurality of the recessed lines is between 0.5 mm and 2.0 mm, and the opening width of the plurality of sipes is between 2.0 mm and 20.0 mm.

9. The competition wheelchair tire of claim 1, wherein the plurality of the recessed lines extend orthogonally relative to the tire equator, and the plurality of sipes extend in a direction inclined at an angle between 30° and 90° relative to the tire equator.

* * * * *